Figure 10:
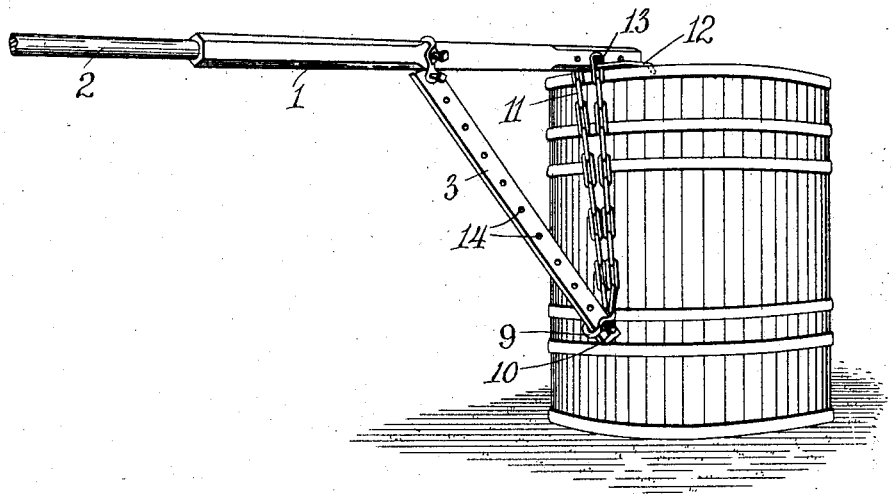

F. T. GRACEY.
MEANS FOR MOVING HEAVY OBJECTS.
APPLICATION FILED SEPT. 12, 1907.
907,034.
Patented Dec. 15, 1908.
4 SHEETS—SHEET 1.
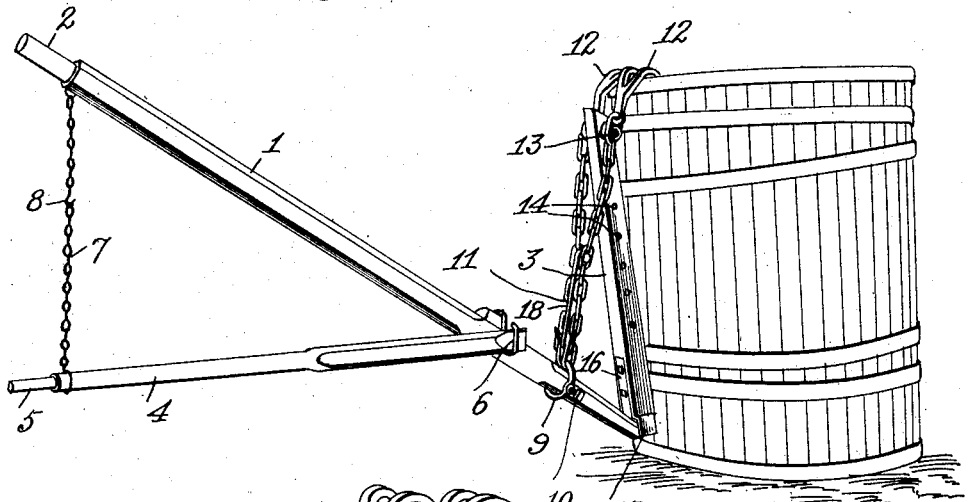
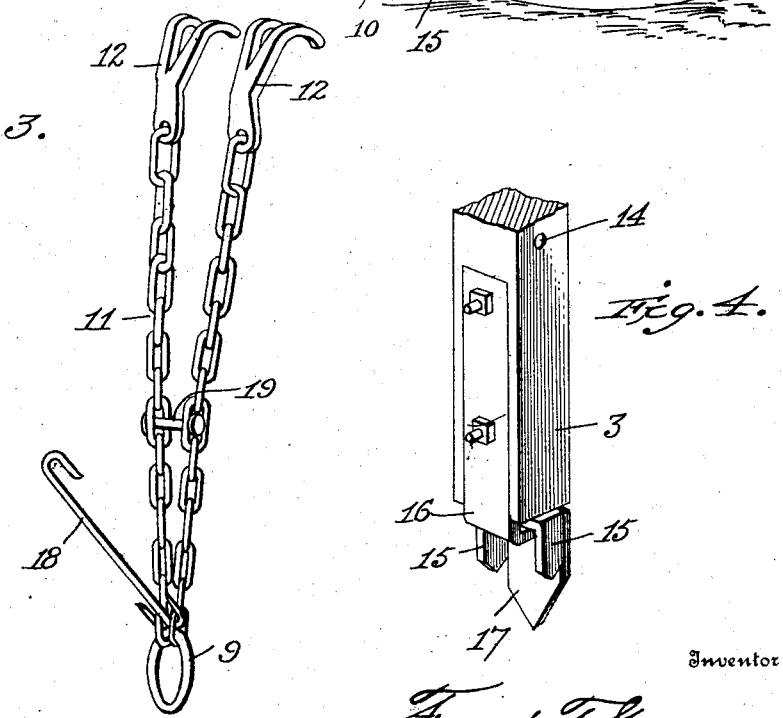

F. T. GRACEY.
MEANS FOR MOVING HEAVY OBJECTS.
APPLICATION FILED SEPT. 12, 1907.
907,034.
Patented Dec. 15, 1908.
4 SHEETS—SHEET 2.
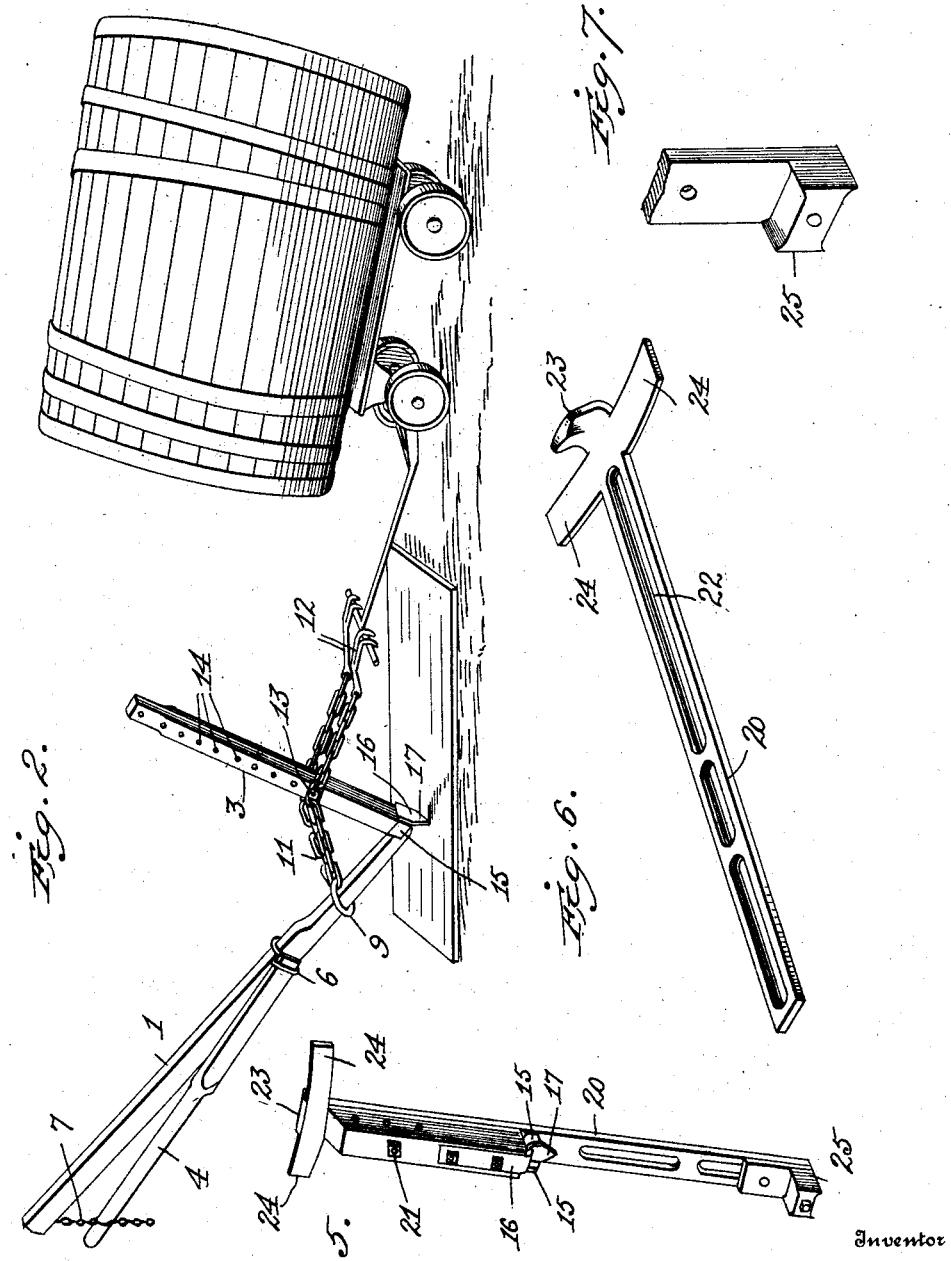

F. T. GRACEY.
MEANS FOR MOVING HEAVY OBJECTS.
APPLICATION FILED SEPT. 12, 1907.
907,034.
Patented Dec. 15, 1908.
4 SHEETS—SHEET 3.
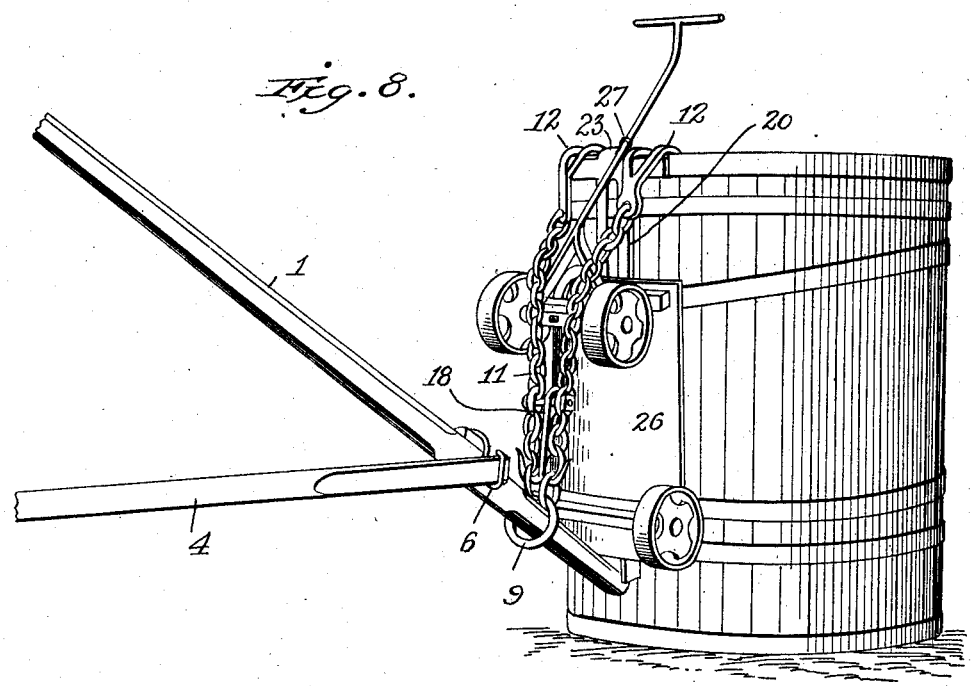
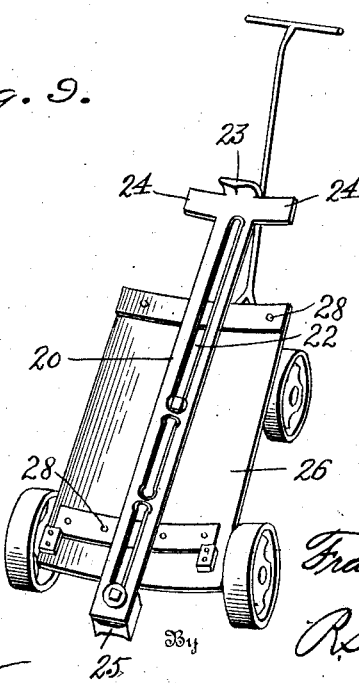

F. T. GRACEY.
MEANS FOR MOVING HEAVY OBJECTS.
APPLICATION FILED SEPT. 12, 1907.

907,034.

Patented Dec. 15, 1908.

4 SHEETS—SHEET 4.

UNITED STATES PATENT OFFICE.

FRANK T. GRACEY, OF CLARKSVILLE, TENNESSEE.

MEANS FOR MOVING HEAVY OBJECTS.

No. 907,034.  Specification of Letters Patent.  Patented Dec. 15, 1908.

Application filed September 12, 1907. Serial No. 392,531.

*To all whom it may concern:*

Be it known that I, FRANK T. GRACEY, a citizen of the United States of America, residing at Clarksville, in the county of Montgomery and State of Tennessee, have invented certain new and useful Improvements in Means for Moving Heavy Objects, of which the following is such a full, clear, and exact description as will enable others skilled in the art to which it appertains to make and use the same.

This invention has for its object the provision of simple and efficient means for handling filled hogsheads by the use of which the work will be facilitated and the labor incident thereto greatly lessened. This object is attained in the devices illustrated in the accompanying drawings and the invention consists in certain novel features of the same as will be hereinafter first fully described and then particularly pointed out in the appended claims.

In the drawings, Figure 1 is a perspective view of one form of my invention operatively applied to a filled hogshead; Fig. 2 is a similar view showing the device arranged to facilitate the hauling of a loaded truck; Fig. 3 is an enlarged detail view of the chain shown in Fig. 1; Fig. 4 is an enlarged detail view of the lower end of the brace or fulcrum member; Fig. 5 is a view showing a modification of the said member; Figs. 6 and 7 are detail views of the construction shown in Fig. 5; Fig. 8 is a view showing another adaptation of the invention; Fig. 9 is a view of the truck shown in Fig. 8, and Fig. 10 is a view of a modification.

Referring to the drawings in detail, 1 designates a lever or handle which may be constructed with a telescoping member, 2, in order to accommodate a greater number of workmen and increase the leverage when necessary. The lower end of the handle or lever member is tapered to engage under the lower end of a brace or fulcrum member, 3. A supplemental handle or foot lever, 4, may be employed to enable the laborers to throw their entire weight on the device and this supplemental lever may be provided also with a telescoping member, 5, as will be readily understood. This supplemental lever is pivotally secured at its lower end to the side of the main lever or handle through a stirrup or yoke connection, as shown at 6, and the upper ends of the two levers are connected by a chain, 7, which is preferably provided with a hook or similar device, 8, whereby it may be adjusted in length as desired. The stirrup or yoke 6 may be arranged to bring the supplemental lever to either side of the main lever, as may be desired, and the pivotal connection between the two levers permits them to fold together as they reach the floor or ground.

Beyond the pivotal connection of the two levers, a ring or sleeve, 9, is mounted on the main lever and is, by preference, adjustably secured thereto by a set screw, 10. A chain, 11, is attached to this ring or sleeve 9 and extends up past the fulcrum bar 3, being provided at its upper or free end with a grappling hook, 12, to engage the upper chine of the hogshead. This chain is preferably formed in two members which pass on opposite sides of the fulcrum or brace member and engage a bolt, 13, which is fitted in one of a series of transverse openings, 14, in said member. In the form of the invention shown in Figs. 1 and 2, this brace or fulcrum member consists of a solid bar or standard provided throughout its length with the transverse openings, 14, and fitted at its lower end with keepers or ears, 15, projecting downward to fit against the sides of the main lever or handle and thereby aid in maintaining the proper relative positions of the parts. The brace or fulcrum member is further fitted at its lower end with a shoe or bracket, 16, which consists of a plate secured to the front side of the body of the member, passing under the lower end of the same between the ears or keepers 15 and finally bent downward just in rear of the keepers to present a large fulcrum blade or point, 17, against which the end of the main lever or handle bears and which has its edge preferably V-shaped to present a point which will engage the ground or warehouse floor and serve as a fulcrum when the device is employed for hauling.

The use of the device constructed in accordance with the foregoing description will be readily understood and appreciated. When it is desired to tilt a loaded hogshead, the brace member is placed against the same with the end of the main lever engaging under the lower end of the same and the hooks at the upper end of the chain engaging the chine of the hogshead, as shown in Fig. 1. The chain is then adjusted to the proper tension by shifting the bolt 13 and the ring 9, as will be readily understood. The laborers then take their positions along the main handle or lever and exert a downward pull thereon to swing the same toward the ground, the movement thereby imparted to the lever being transmitted through the chain to the hogshead to tilt the same. The chains, being flexible, permit the parts to readily collapse or fold together in order that the device may be withdrawn while the hogshead is held balanced, after which the hogshead is permitted to drop on its side to be rolled to the desired point. The laborers can throw their entire weight on the work by placing their feet on the supplemental lever and when the said lever reaches the ground or floor it will fold toward the main lever to rest beside the same when the said main lever has been swung downward. The pressure applied to the supplemental lever is transmitted to the main lever through the chain connecting the free ends of the same while the lower end of the main lever is prevented from rising by the fulcrum member which, in turn, is held down against the lever by the chain passing from the lever to the hogshead.

In Fig. 2 I have illustrated the device arranged for hauling, the chain being adjusted lower on the brace member which in this arrangement is manipulated as a vertical lever. The chain is shown as engaging the handle of a loaded truck but it may be made to engage a large stone or other heavy object ordinarily moved on rollers. The chain 11 may, if desired, be partly collapsed so as to have a shorter working length by causing a hook, 18, pivoted on the main lever, to engage a cross pin or bolt, 19, inserted through the links of the chain at the proper point, as will be readily understood.

In the arrangement illustrated in Fig. 10, the hook 12 is attached to the end of the lever 1 while the brace or fulcrum member 3 has its upper end attached to the lever by an adjustable pivot and its lower end arranged to bear against the side of the hogshead. The chain 11 extends between the two members to prevent spreading of the same and has one end attached to the lower end of the brace member and its opposite end attached to the lever near the hooks.

In Figs. 5 and 6 is shown a modification of the brace or fulcrum member. In this form, the body of the member is considerably shorter than the body shown in Fig. 1 so as to be fitted to a short or low hogshead and in order that the same member may be used on a large hogshead a holding bar, 20, is removably secured to the back of the body or main bar by a bolt, 21, inserted through the body and a longitudinal slot, 22, in the holding bar. This bar may be made in one piece but it is preferably constructed in two sections adjustably held together by the bolt 21 whereby the bar may be adjusted to the height of the hogshead. At its upper end, the holding bar is provided with a tooth or spur, 23, adapted to engage over the edge of the hogshead and with lateral concave arms, 24, to bear against the side of the hogshead and prevent displacement of the bar. At the lower end of the bar is adjustably secured a heel or block, 25, having concave ends adapted to be engaged by the end of the main lever or handle. This form of the brace or fulcrum member is used in connection with the chain and the lever members in exactly the same manner as the form shown in Fig. 1 and previously described.

In Figs. 8 and 9 is shown a further application of the invention. In this form, the holding bar 20 is removed from the main body of the fulcrum member and secured longitudinally of and centrally to a truck, 26, the shoe or block 25 fitting against the rear edge of the truck and the hook or spur 23 projecting upward beyond the front end thereof. The truck thus equipped is hung on the hogshead and the handle of the truck is held to the tooth by a link, 27, to prevent dropping of the handle after or as the hogshead is tilted. The handle or lever member is then engaged under the heel at the lower end of the holding bar and the chain is passed upward outside the truck and engaged on the hogshead in the same manner as in the previously described forms, the chain being adjusted taut across the front axle of the truck so that the truck serves as the body of the brace or fulcrum member. In this form of the invention, when the hogshead is brought over it is already in position on the truck to be moved to the desired point. The spur 23 prevents the hogshead being pushed forward from the truck and causes pressure applied to the rear end of the hogshead to be transmitted to the truck to aid in propelling the same. It has been found advantageous at times to engage the end of the operating lever under the rear axle of the truck instead of under the end of the holding bar and a hook may be added in this arrangement to engage slightly over the axle to maintain the proper relative position of the parts. This arrangement permits pressure to be exerted through the lever handle against the truck to prevent the same swinging away from the hogshead as the same tilts and until the back wheels of the truck touch the floor. The lever is then withdrawn, the small teeth 28 on the truck having engaged the hogshead by that time to prevent slipping of the same while it is held balanced in a tilted position.

By the use of my device filled hogsheads which have been packed closely together can be removed from a storeroom or a car with half the labor heretofore necessary and the work required to move the hogsheads from place to place is reduced to the minimum.

Having thus described my invention, what I claim and desire to secure by Letters-Patent is:—

1. The combination of a lever member, a fulcrum member, an object-engaging member attached to the lever member and passing across the fulcrum member, a supplemental lever pivotally attached to the lever member, and a flexible connection between the free ends of the lever member and the supplemental lever.

2. The combination of a lever member, a fulcrum member, a flexible object-engaging member attached to the lever member and passing across the fulcrum member, and means for varying the working length of the flexible object-engaging member.

3. The combination of a lever member, a fulcrum member, a chain attached to the lever member and supported by the fulcrum member and provided with object-engaging means, and a hook pivotally mounted on the lever member and arranged to engage said chain.

4. The combination of a lever member, a fulcrum member, and an object-engaging member carried by the lever member and connected with the fulcrum member, the said fulcrum member having a holding bar arranged to be engaged by the lever member and to engage the object.

5. The combination of a lever member, a fulcrum member having a holding bar provided at its lower end with a shoe to be engaged by the lever member and provided at its upper end with a holding device, and an object-engaging member attached to the lever member and passing across the fulcrum member.

6. The combination of a lever member, a fulcrum member having a holding bar provided at its upper end with lateral arms, and an object-engaging member attached to the lever member and passing across the fulcrum member.

7. The combination of a lever member, a fulcrum member having a holding bar provided at its upper end with a holding tooth and lateral arms and having a heel at its lower end to be engaged by the lever member, and an object-engaging member attached to the lever member and connected to the fulcrum member.

In testimony whereof, I have signed this specification in the presence of two subscribing witnesses.

FRANK T. GRACEY.

Witnesses:
THOS. D. MABEY,
C. D. RUNYON.